(12) United States Patent
Kamei et al.

(10) Patent No.: US 6,630,911 B2
(45) Date of Patent: Oct. 7, 2003

(54) COMPACT ANTENNA AND PRODUCING METHOD THEREOF

(75) Inventors: Yoshikazu Kamei, Tokyo (JP); Takanori Washiro, Tokyo (JP); Hiroki Hamada, Tokyo (JP); Takahiro Ueno, Tokyo (JP); Masayuki Ishiwa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/024,085

(22) Filed: Dec. 17, 2001

(65) Prior Publication Data

US 2002/0080076 A1 Jun. 27, 2002

(30) Foreign Application Priority Data

| Dec. 27, 2000 | (JP) | 2000-397311 |
| Apr. 19, 2001 | (JP) | 2001-121732 |
| Aug. 29, 2001 | (JP) | 2001-259978 |
| Dec. 4, 2001 | (JP) | 2001-370483 |

(51) Int. Cl.[7] .............................................. H01Q 1/40
(52) U.S. Cl. ............................. 343/873; 343/700 MS; 343/895
(58) Field of Search .................. 343/700 MS, 702, 343/895, 873; 228/175, 128, 151

(56) References Cited

U.S. PATENT DOCUMENTS

| 5,611,874 A | * | 3/1997 | Zadno-Azizi et al. ......... 148/402 |
| 5,772,105 A | | 6/1998 | Zadno-Azizi et al. |
| 5,825,334 A | | 10/1998 | Gherardini et al. .......... 343/830 |
| 6,109,962 A | | 8/2000 | Chen-Shiang ................ 343/870 |
| 6,187,454 B1 | | 2/2001 | Rivassou ..................... 428/670 |

FOREIGN PATENT DOCUMENTS

| JP | SHO 62-37412 U | 3/1987 | ............. H01Q/1/38 |
| JP | 56 027501 | 3/1991 | |
| JP | HEI 3-104302 A | 5/1991 | ............. H01Q/1/32 |
| JP | HEI 3-47002 B | 7/1991 | ............. H01Q/1/36 |
| JP | 06 164235 | 6/1994 | |
| JP | 2568927 | 1/1998 | ............. H01Q/1/10 |
| JP | HEI 11-186821 A | 7/1999 | ............. H01Q/1/24 |
| JP | HEI 11-317613 A | 11/1999 | ............. H01Q/11/08 |
| WO | WO 98/49742 | 11/1998 | ............. H01Q/1/38 |

* cited by examiner

*Primary Examiner*—Hoang Nguyen
(74) *Attorney, Agent, or Firm*—Knobbe Martens Olson & Bear LLP

(57) ABSTRACT

A compact antenna comprises a core which is a hard linear member having a predetermined shape corresponding to resonance characteristic, a conductor film which covers at least a portion of an outer surface of the core and which has higher electric conductivity than that of the core, and a substrate which closely surrounds and holds the outer surface of the core covered with the connection film. A film thickness of the conductor film is equal to a skin depth and thus, it is possible to inexpensively maintain reliability, and to prevent radiation efficiency from being lowered.

14 Claims, 19 Drawing Sheets

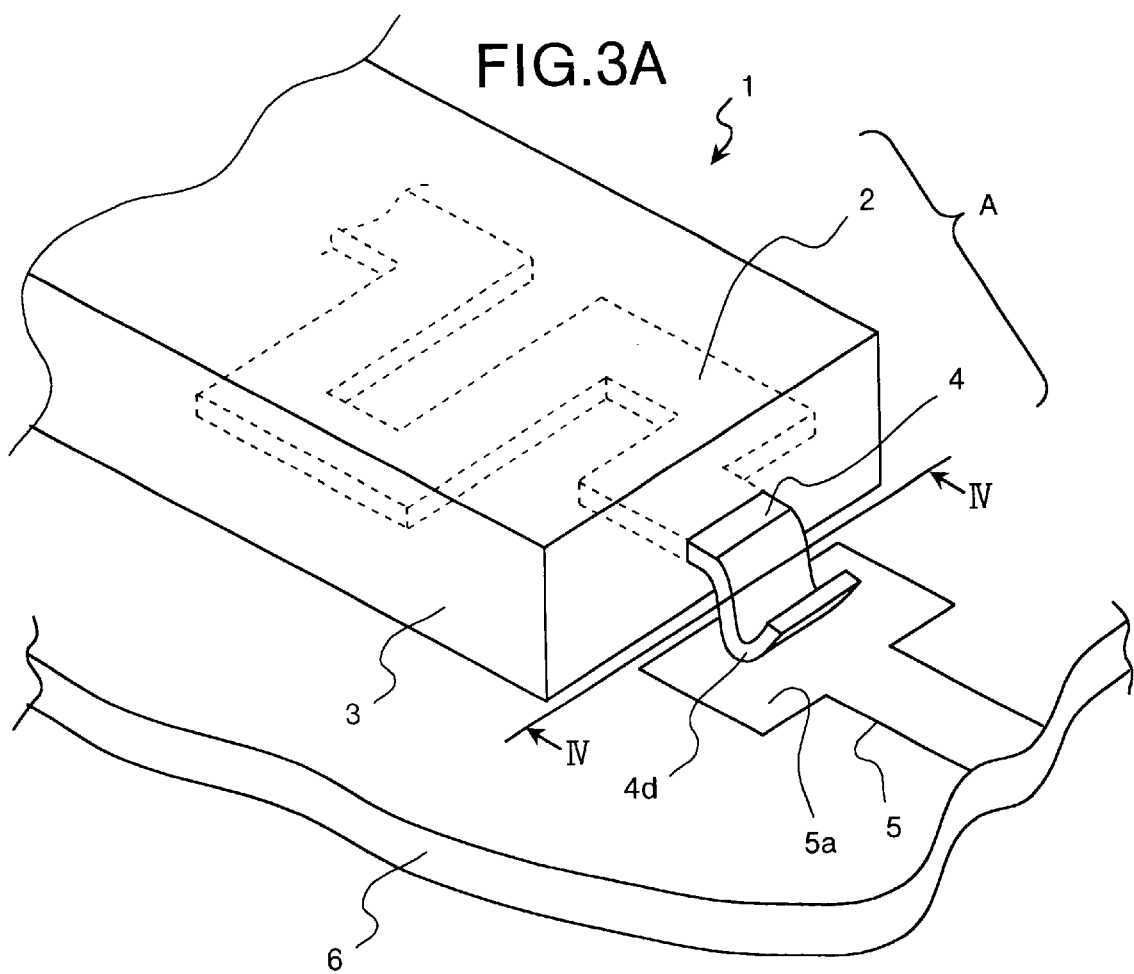

200 μm

100 μm

2a

2b

2b

2b

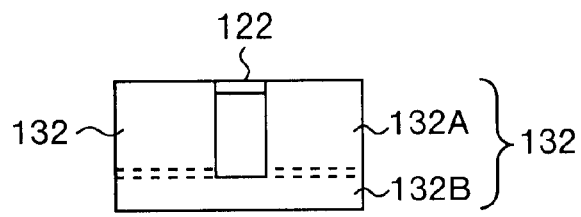
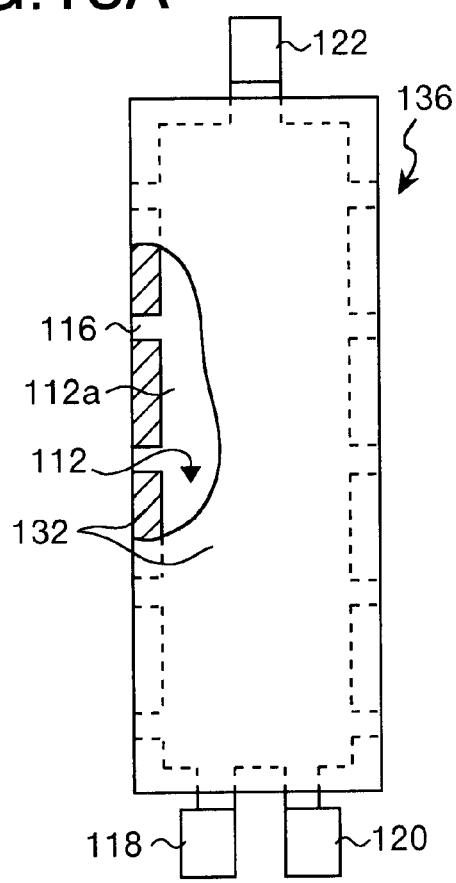 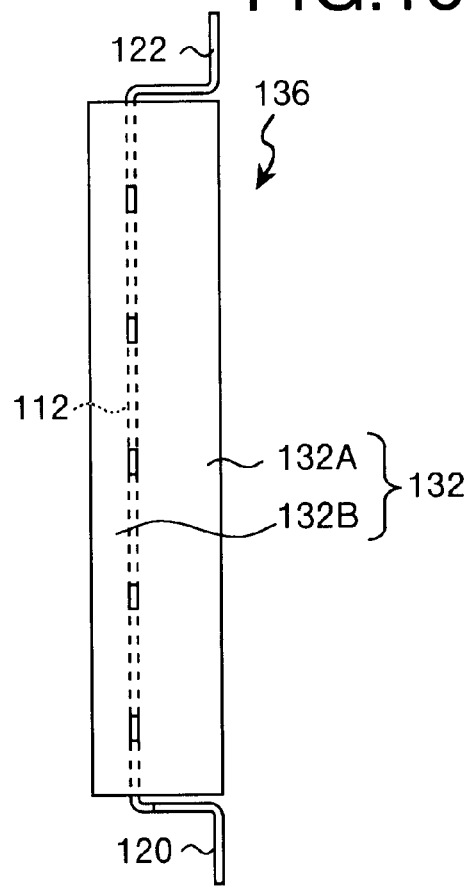
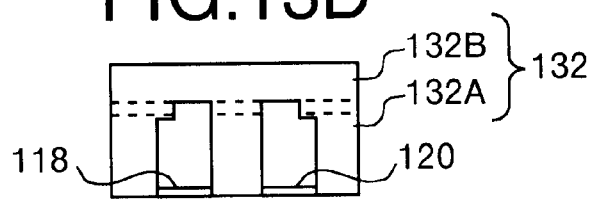

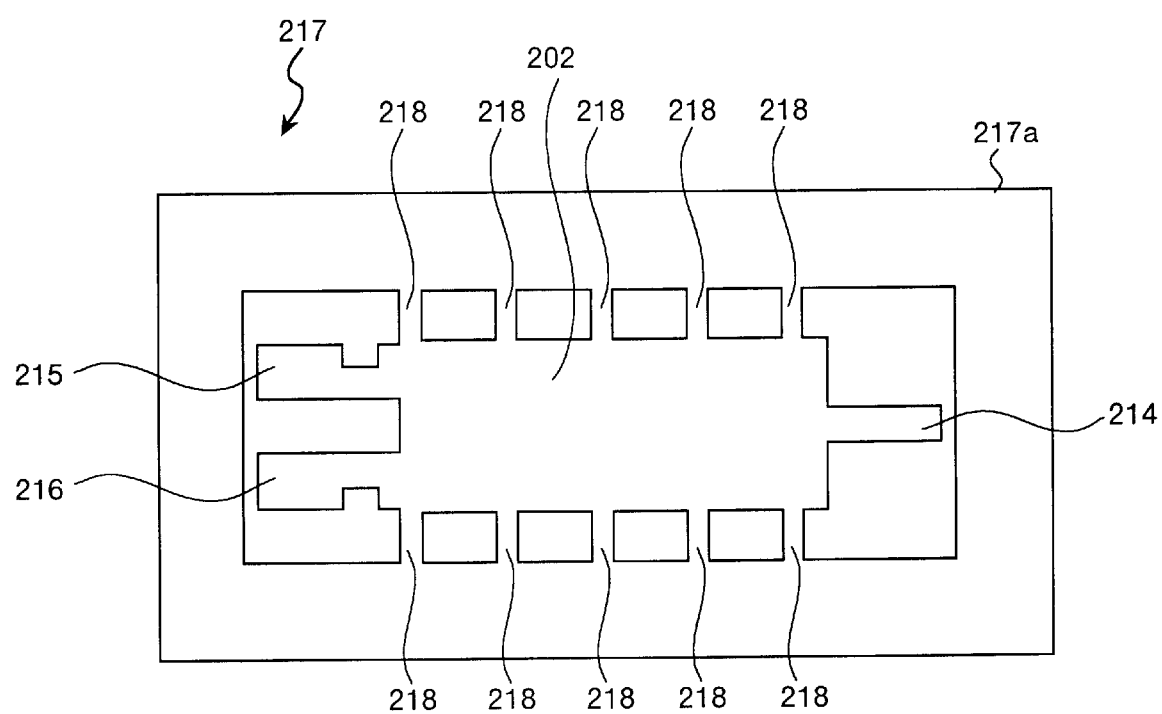

COMPACT ANTENNA AND PRODUCING METHOD THEREOF

BACKGROUND OF THE INVENTION

FIELD OF THE INVENTION

The present invention relates to a compact antenna used for a portable terminal, and to a producing method of the compact antenna.

FIG. 26 show an outline structure of a conventional compact antenna used for a portable terminal. An antenna 301 shown in FIG. 26A has a meander-shaped radiating section 301a, and the radiating section 301a is surrounded by a dielectric 301b. The radiating section 301a is continuously formed with a terminal 301c to be connected to a circuit board. Similarly, a compact antenna 302 shown in FIG. 26B has a helical-shaped radiating section 302a surrounded by a dielectric 302b. The radiating section 302a is continuously formed with a terminal 302c.

To enhance the radiation efficiency of the antennas, it is necessary to enhance the electric conductivity of each of the radiating sections 301a and 302a as high as possible. That is, if the electric conductivity of each of the radiating sections 301a and 302a is low, a rate of electric power supplied to the radiating sections 301a and 302a which becomes thermal energy and is lost is increased. Therefore, it is preferable that the electric conductivity is as high as possible.

SUMMARY OF THE INVENTION

It is an object of this invention to provide a compact antenna capable of enhancing the radiation efficiency.

It is another object of this invention to provide a compact antenna capable of being mounted strongly to a circuit board, and to provide a producing method of the compact antenna.

According to one aspect of the invention, a compact antenna comprises an antenna conductor having a bent linear core, and a connection film which covers at least a portion of an outer surface of the core and which has higher electric conductivity than that of the core.

The connection film has a film thickness equal to or greater than a skin depth δ specified by the following equation:

$$\delta = \sqrt{2/(\sigma \cdot \mu \cdot \omega)},$$

Wherein σ is electric conductivity of the conductor, μ is magnetic permeability and ω is angular frequency.

According to another aspect of the invention, a compact antenna having an antenna conductor comprises a radiating section for sending and receiving radio wave, and a terminal for connecting the radiating section and a circuit board, the terminal is coated with a connection film for enhancing soldering characteristic, and the radiating section is not formed with the connection film.

According to still another aspect of the invention, a producing method of a compact antenna comprises a stamping step in which an antenna conductor comprising a radiating section for sending and receiving radio wave and a terminal for connecting the radiating section to a circuit board is formed by stamping a metal plate, a coating step which coats the radiating section with dielectric, and a connection film forming step in which the connection film is selectively formed for the terminal using the dielectric as a mask.

Other objects and features of this invention will become understood from the following description with reference to the accompanying drawings.

BRIEF DESCRIPTION OF THE DRAWINGS

FIGS. 13 shows one example of a compact antenna produced by a producing method shown in the second embodiment, wherein FIG. 13A is a plan view, FIG. 13B is a side view and FIG. 13C is a rear view and FIG. 13D is a front view;

FIGS. 18 shows a mounting state around a mounting section of the antenna conductor shown in FIG. 16, wherein

FIG. 23 shows a metal plate when the terminal and the frame are separated from each other;

DETAILED DESCRIPTIONS

The present invention has been achieved in order to solve the following problems.

As described above, it is necessary that an antenna conductor has excellent radiation efficiency, but it is also important that the antenna conductor is sufficiently connected to a circuit board when the antenna conductor is mounted to the circuit board.

Preferred embodiments of a compact antenna according to the present invention will be explained below with reference to the accompanying drawings.

Figure 1:
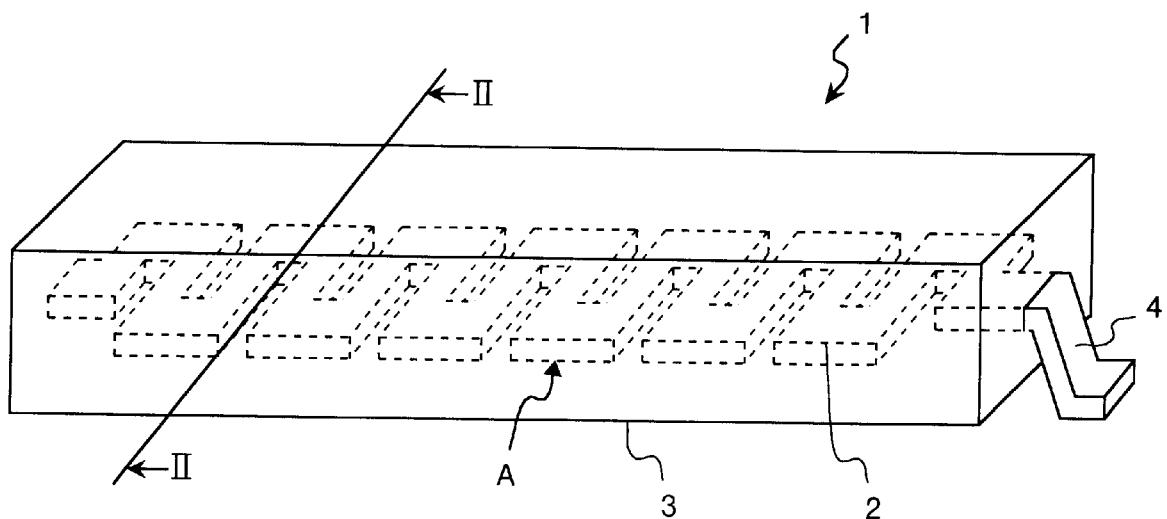
FIG. 1 shows an outline structure of a compact antenna according to a first embodiment of the invention.

FIG. 1 is a perspective view of an outline structure of a compact antenna according to a first embodiment of the invention. In FIG. 1, the compact antenna 1 comprises an antenna conductor A having a terminal 4 and a radiating section 2 bent into a meander shape, and a substrate 3 made of dielectric. The substrate 3 surrounds the radiating section 2 without gap, and its outer appearance is formed into a rectangular parallelepiped. The terminal 4 projecting from the dielectric substrate 3 is formed on one end of the radiating section 2.

Figure 2:
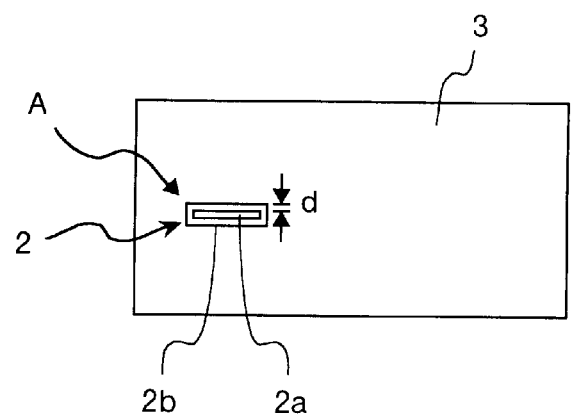
FIG. 2 is a transverse sectional view of a structure of the compact antenna shown in FIG. 1.

FIG. 2 is a transverse sectional view of the compact antenna 1 shown in FIG. 1. In FIG. 2, the radiating section 2 is surrounded by the substrate 3 without gap. The substrate 3 is formed of a dielectric material. The radiating section 2 comprises a core $2a$ formed by stamping a metal plate material, that is linear and hard having spring force, such as phosphor bronze and iron. The radiating section 2 also comprises a conductor film $2b$ formed by plating an outer surface of the core $2a$ with material having higher electric conductivity than the core $2a$ such as pure copper. The conductor film $2b$ is formed around the entire periphery of the core $2a$ over its entire length. A thickness d of the conductor film $2b$ is equal to a skin depth $\delta$.

In generally, high frequency current flows through a conductor, the current intensively flows from a surface of the conductor toward a region of the skin depth $\delta$ by skin effect. This skin depth $\delta$ is a depth defined as $$\delta = \sqrt{(2/(\sigma \cdot \mu \cdot \omega))},$$

wherein $\sigma$ is electric conductivity of the conductor, $\mu$ is magnetic permeability and $\omega$ is angular frequency ($2\pi \times$ frequency)

Therefore, if the film thickness d of the conductor film $2b$ of the radiating section 2 is set to skin depth $\delta$ or higher, most of current flows through the conductor film $2b$ of the high electric conductivity, and does not flow through the core $2a$ and thus, it is possible to sufficiently enhance the radiation efficiency of the antenna. In this case, since the core $2a$ is made of hard material having spring force, it is possible to suppress deformation of the core $2a$ when the antenna is produced, and to enhance the reliability of the radiating section 2.

FIG. 3 show a structure around the terminal 4 of the antenna conductor A. FIG. 4 is a transverse sectional view of the terminal 4 shown in FIG. 3. The core $2a$ of the radiating section 2 of the antenna conductor A is made of phosphor bronze, and the conductor film $2b$ is made of pure copper. As shown in FIG. 4, a multi-layered film comprising a conductor film $4b$ made of Ni (nickel) and a conductor film $4c$ made of gold (Au) as a connection film is metallized on the terminal 4. The Ni of the conductor film $4b$ is provided to enhance adhesion (wettability) with respect to the Au. The Au of the conductor film $4c$ is for preventing rust and for enhancing soldering wettability.

Figure 3B:
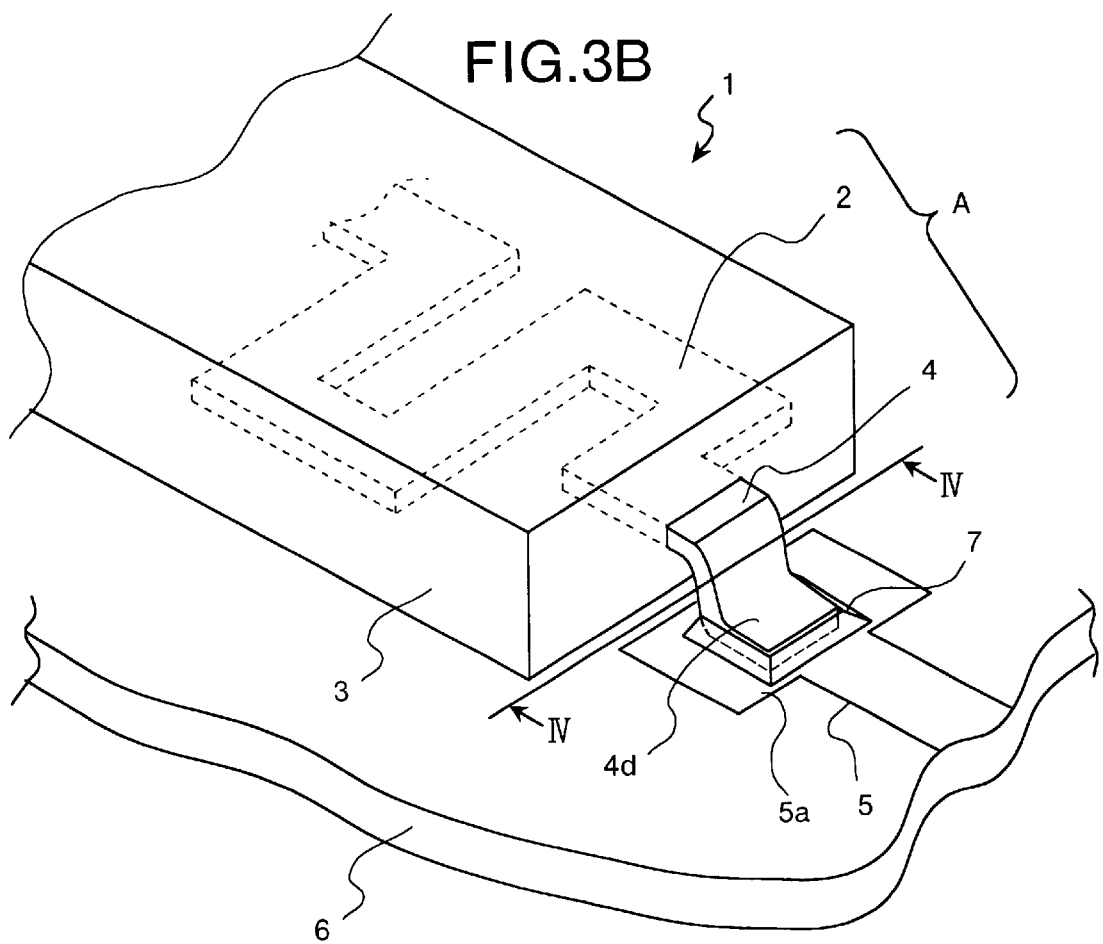
FIGS. 3 shows a state of connection between the antenna shown in FIG. 1 and a circuit board, FIG. 3A and FIG. 3B each showing the state of a different example.
Figure 4:
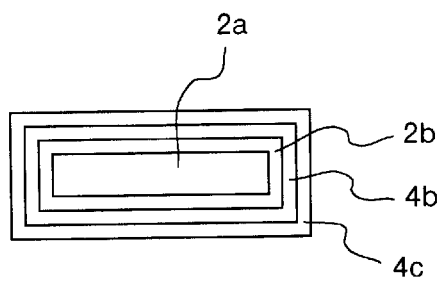
FIG. 4 is a transverse sectional view of a structure of a terminal of the antenna conductor shown in FIG. 3.

In an example shown in FIG. 3A, a tip end $4d$ of the terminal 4 is in strong elastic contact with a mounting section $5a$ of the conductor pattern 5 formed on the board 6, so that they are electrically connected to each other. In an example shown in FIG. 3B, the tip end $4d$ of the terminal 4 is soldered to the mounting section $5a$ of the board 6, and they are electrically connected to each other through solder 7.

Although only one conductor film $2b$ is formed in the radiating section 2 in the above-described substrate 3, the invention is not limited to this structure, and a plurality of layers made of high electric conductivity metal may be laminated on one another.

Even if the conductor film $2b$ does not cover the entire outer surface of the core $2a$, it is possible to prevent the radiation efficiency from being lowered to some degree. FIG. 5 show examples of the conductor film $2b$ covering the outer surface of the core $2a$ of the radiating section 2. FIG. 6 shows variations of radiation efficiency with respect to the structures of the conductor film $2b$ shown in FIG. 5.

Figure 5A:
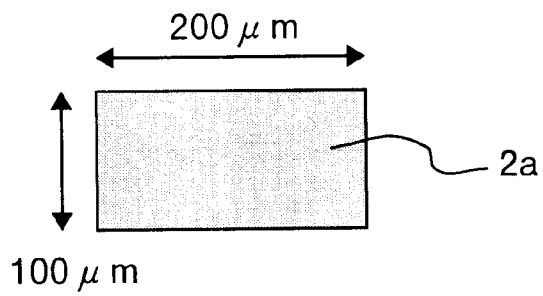
FIG. 5 are sectional view of an embodiment showing a rate of a conductor film provided on an outer surface of a core.
Figure 5B:
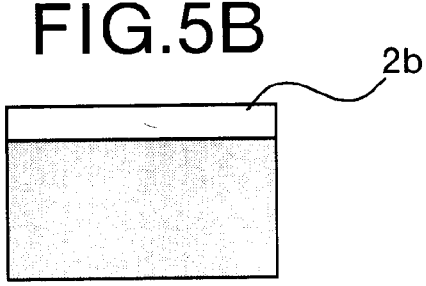
Figure 5C:
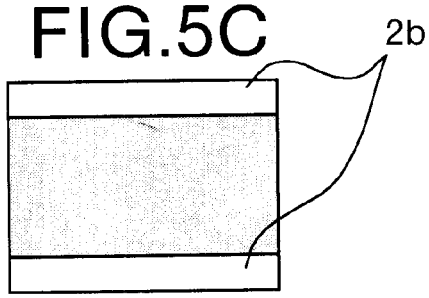
Figure 5D:
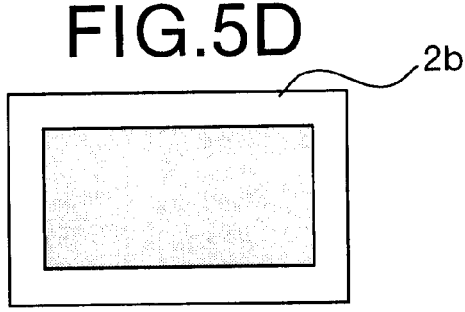
Figure 6:
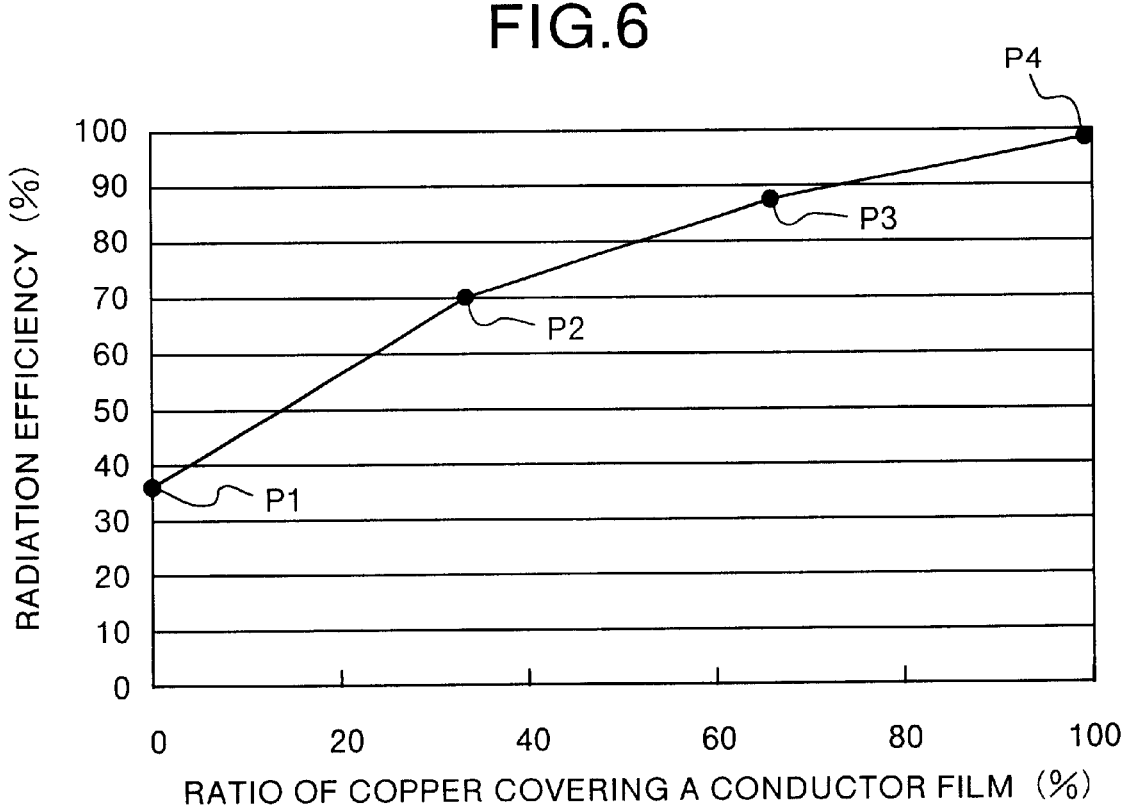
FIG. 6 shows a variation in radiation efficiency with respect to a rate of the conductor film shown in FIG. 5.

FIG. 5A is a sectional view of a case in which the conductor film is not formed on the outer surface of the core $2a$, FIG. 5B is a sectional view of a case in which the conductor film is formed only on one long side region of the core $2a$, FIG. 5C is a sectional view of a case in which the conductor films are formed on only two long side regions of the core $2a$, and FIG. 5D is a sectional view of a case in which the conductor film is formed on the entire outer surface of the core $2a$. Points P1 to P4 in FIG. 6 show radiation efficiency (%) when structuring shown in FIG. 5A to FIG. 5D. An area of cross section of the core $2a$ is 100 $\mu$m×200 $\mu$m.

As shown in FIG. 6, if radiation efficiency when the radiating section 2 is entirely made of pure copper is defined as being 100%, in the case where the conductor film is not formed at all (FIG. 5A), the radiation efficiency is about 38%. When the conductor film is formed only on one long side region (FIG. 5B), the radiation efficiency is about 70%. When the conductor films are formed on only two long side regions (FIG. 5C), the radiation efficiency is about 89%. When the conductor film is formed on the entire outer surface of the core $2a$ (FIG. 5D), the radiation efficiency is about 100%, which is substantially the same as a radiating section entirely made of copper.

It is found from the above results that the antennas of these examples have the following merits. That is, when the conductor film made of pure copper is provided on the entire outer surface of the core $2a$, it is possible to realize substantially the same radiation efficiency as that of the radiating section 2. Furthermore, since the core $2a$ is made of phosphor bronze, the radiating section 2 is hard and has spring force enough to maintain high reliability. When a material having high electric conductivity such as gold or silver is applied to the conductor film, the radiation efficiency can further be enhanced more effectively. In this case, since it is possible to reduce the amount of gold or silver as compared with a radiating section 2 entirely made of expensive gold or silver, high radiation efficiency can be obtained inexpensively.

Even if the conductor film $2b$ is formed on only a portion of the core $2a$ (FIG. 5B and FIG. 5C), relatively high radiation efficiency can be maintained by the skin effect.

In generally, if the radiating section 2 is formed into a meander shape or helical shape, there is a problem that radiation efficiency is deteriorated as compared with a linear radiating section 2, but if the conductor film 2b is provided as in the antennas of the above examples, this problem can be solved.

A producing method of the compact antenna will be explained next. To produce the compact antenna 1, first, the core 2a bent into the meander shape having a cross section of 100 μm×200 μm is formed by stamping a plate metal of phosphor bronze. Thereafter, the outer surface of the core 2a is plated with copper, thereby forming the conductor film 2b.

The copper plated antenna conductor A is inserted into an injection molding metal mold, a dielectric material (ceramic-resin compound material) is injection molded into a rectangular parallelepiped, thereby forming the substrate 3. At that time, the terminal 4 comes outside the substrate 3. When the terminal 4 is metallized, the conductor film 2b is formed and then, the terminal 4 is sequentially coated with the conductor materials.

Although the film thickness d of the conductor film 2b is set to the skin depth δ in the metal mold 1 in the first embodiment, the film thickness dispreferably thicker than the skin depth δ. However, the film thickness d may also be thinner than the skin depth δ. Moreover, the conductor film 2b may be formed on a portion of the outer surface of the core 2a. In addition, a structure for varying the film thickness d may also be combined. In any cases, in contrast to when no conductor film 2b is provided, it is possible to obtain the skin effect, and the spring force of the antenna conductor A can be maintained, and the radiation efficiency can be prevented from being deteriorated.

Figure 7:
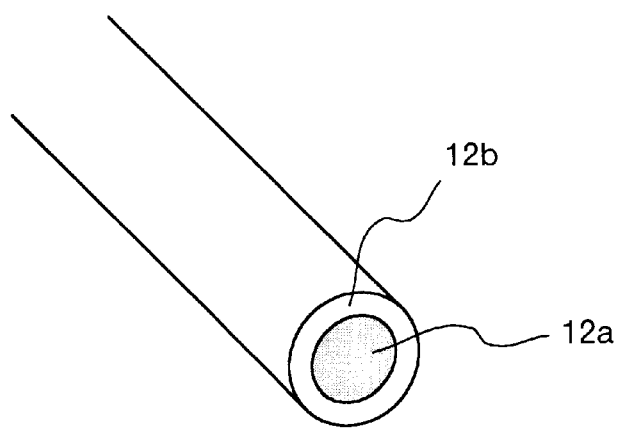
FIG. 7 shows a case in which the cross section of the radiating section is circular in shape.

Although the radiating section 2 is formed into the meander shape in the first embodiment, the invention is not limited to this, and an arbitrary shape such as helical shape may be employed. The cross section of the radiating section 2 is rectangular in shape in the first embodiment, the invention is not limited to this, and the cross section of the radiating section 2 may be formed into an arbitrary shape such as a circle (see FIG. 7) and an ellipse. In this case, for example, as shown in FIG. 7, a core 12a is formed at its outer surface with a conductor film 12b, and its thickness d is set to the skin depth δ.

Figure 8:
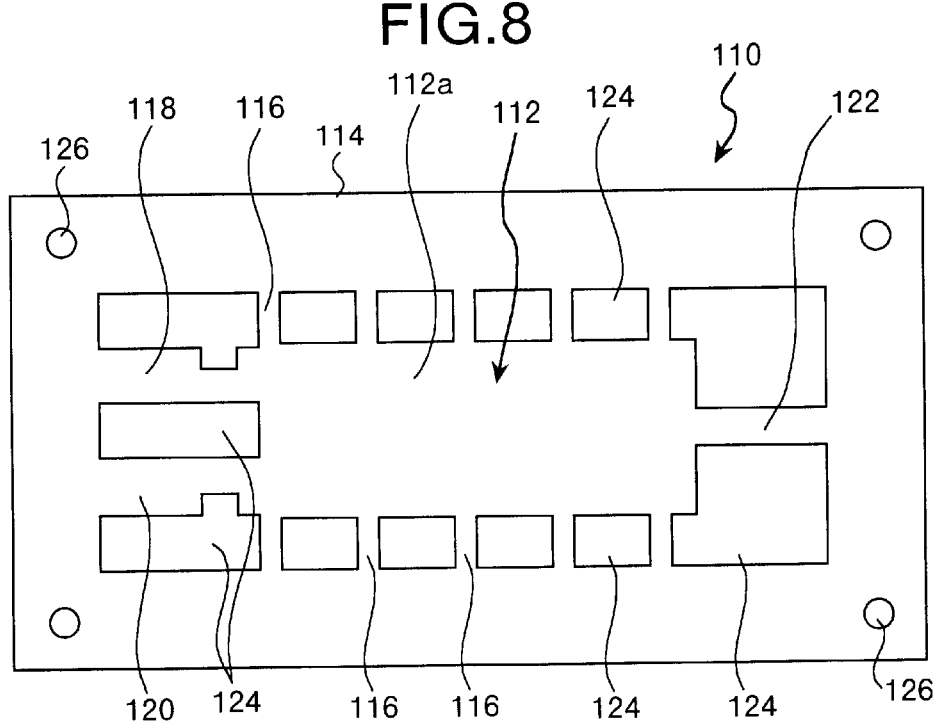
FIG. 8 is a plan view of a conductor pattern including the antenna conductor used in a second embodiment of the invention.

A producing method of an antenna of a second embodiment will be explained. First, a conductor pattern 110 as shown in FIG. 8 is formed by stamping or etching a metal thin plate (stamping step). The conductor pattern 110 has a rectangular flat-plate like antenna conductor 112 comprising a metal plate of about 0.1 mm thickness, and a frame 114 (supporting section) surrounding the antenna conductor 112. The frame 114 and the radiating section 112a of the antenna conductor 112 are connected to each other through a plurality of supporting pieces 116 formed between opposite side edges of the radiating section 112a of the antenna conductor 112 at appropriate distances from one another, a feeding terminal 118 and a ground terminal 120 formed on one end edge of the radiating section 112a of the antenna conductor 112, and a fixed terminal 122 formed on the other end edge of the radiating section 112a. In this example, the radiating section 112a and the terminals 118, 120 and 122 constitute the antenna conductor 112. A reference number 124 represents an opening formed by stamping or the like, and a reference number 126 represents a positioning hole.

The frame 114 can be omitted, but the frame 114 facilitates handling of the conductor pattern 110. The fixed terminal 122 is provided if necessary, and it can also be omitted. The ground terminal 120 is omitted depending upon kind of the antenna conductor (for example, when the antenna conductor is of meander shape, the ground terminal 120 is unnecessary).

Figure 9:
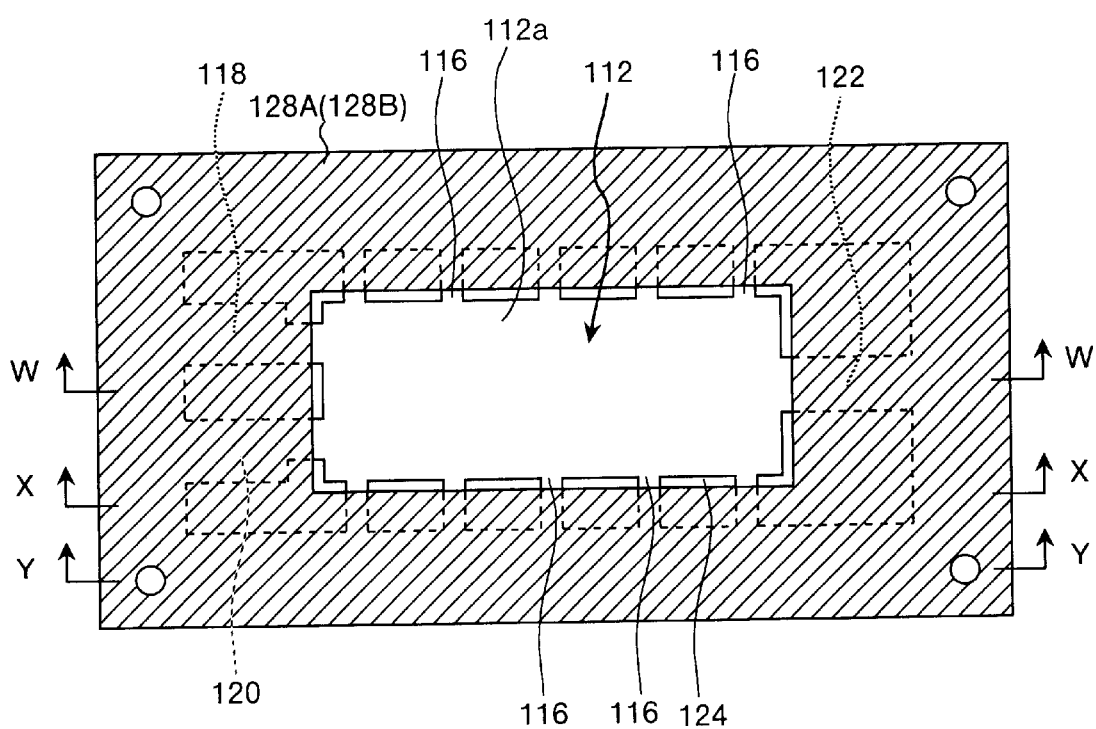
FIG. 9 is a horizontal sectional view of a state in which the conductor pattern is set in a metal mold.
Figure 10A:
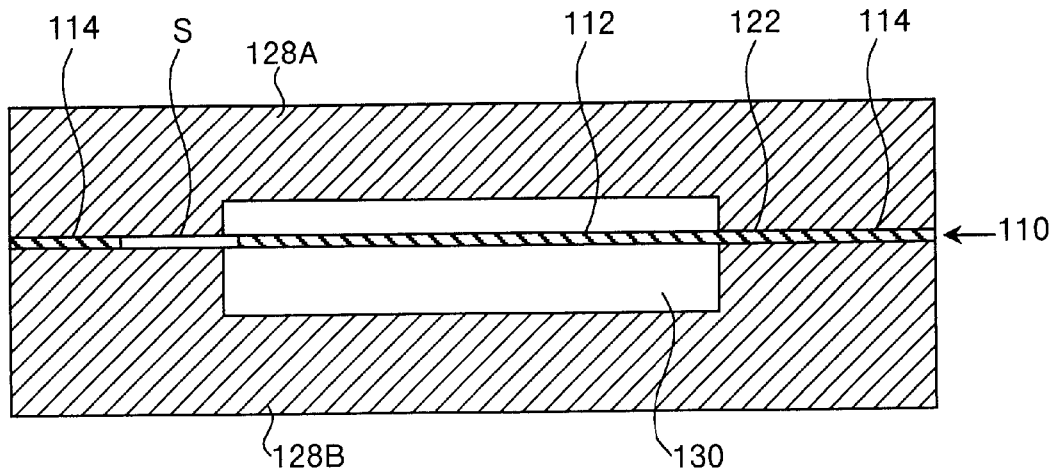
FIG. 10A, FIG. 10B and FIG. 10C are sectional views taken along W—W line, X—X line and Y—Y line in FIG. 9, respectively.
Figure 10B:
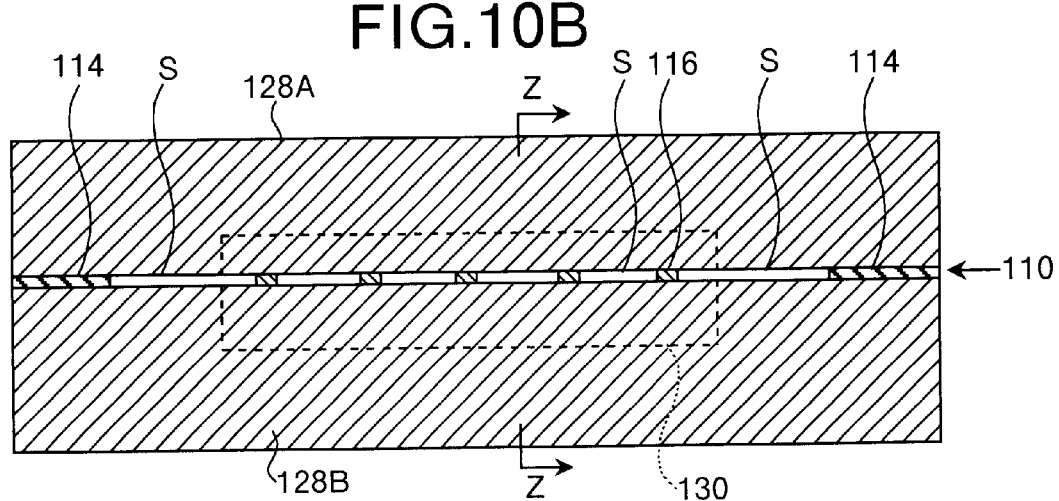
Figure 10C:
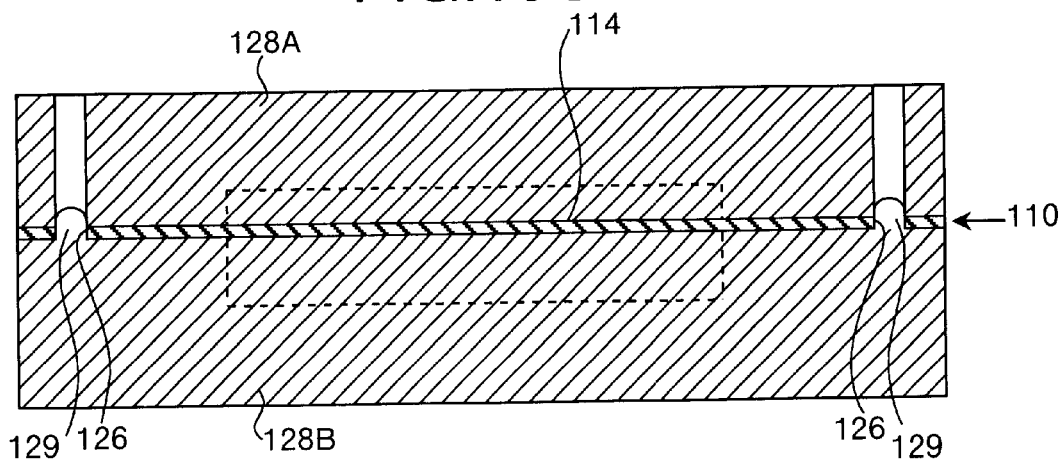
Figure 11:
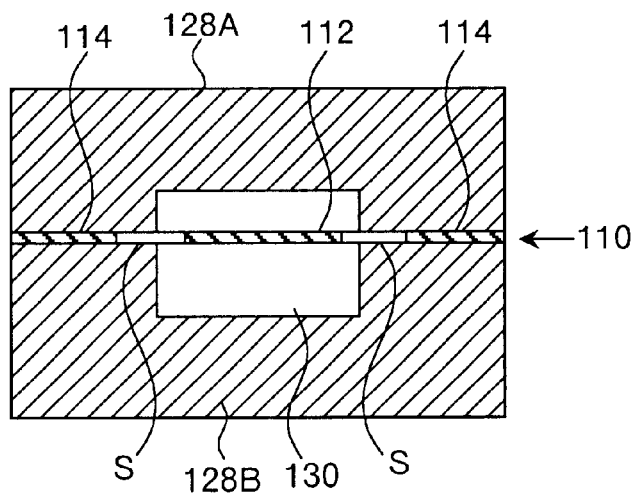
FIG. 11 is a sectional view of a portion in Z—Z line in FIG. 10B.

As shown in FIGS. 9 to 11, the conductor pattern 110 is set to metal molds 128A and 128B with reference to the positioning pin 129 of the lower metal mold 128B. That is, the conductor pattern 110 is set such that the frame 114, an outer end of each of the supporting pieces 116, and each of the terminals 118, 120 and 122 are sandwiched between division surfaces of the upper metal mold 128A and the lower metal mold 128B, and the radiating section 112a of the antenna conductor, inner end portions of the supporting pieces 116, and inner end portions of the terminals 118, 120 and 122 are located in cavities 130 of the metal molds 128A and 128B.

Figure 12:
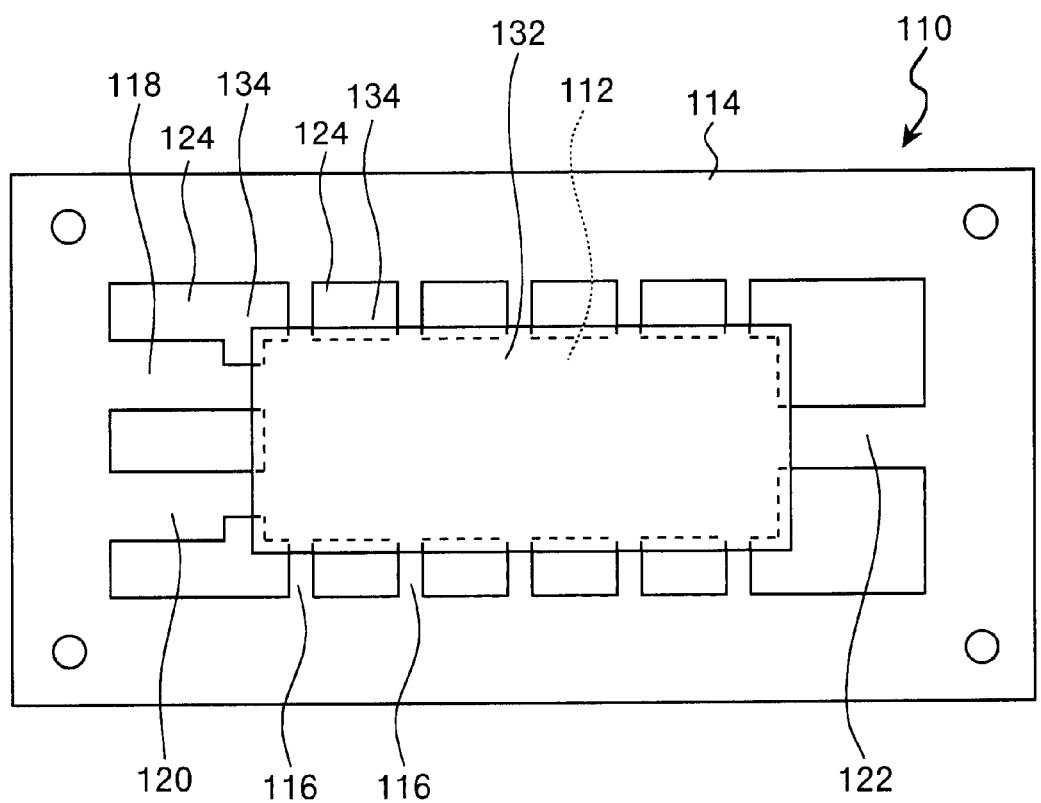
FIG. 12 is a plan view of a state in which a substrate which is integral with the conductor pattern is taken out from the metal mold.

In this state, dielectric obtained by mixing resin and ceramic powder is charged into the cavity 130 (coating step). After the formation, the metal molds 128A and 128B are opened, a resin compact integrally formed with the conductor pattern 110 is taken out. A result is shown in FIG. 12.

After the compact is taken out from the metal mold, this is placed into a plating bath, and is plated with solder (conductor film forming step). After that, the supporting pieces 116 are cut along the opposite side surfaces of the substrate 132 comprising a dielectric, outer ends of the terminals 118, 120 and 122 are cut from the frame 114 and bent, thereby obtaining a compact antenna 136 shown in FIG. 13. In this compact antenna 136, the radiating section 112a of the antenna conductor 112 is buried in the substrate 132, the feeding terminal 118 and the ground terminal 120 project from one of end surfaces of the substrate 132, and a fixed terminal 122 projects from the other end surface. The compact antenna 136 is to be mounted to a surface. The terminals 118, 120 and 122 are plated with solder as conductor films.

Figure 14:
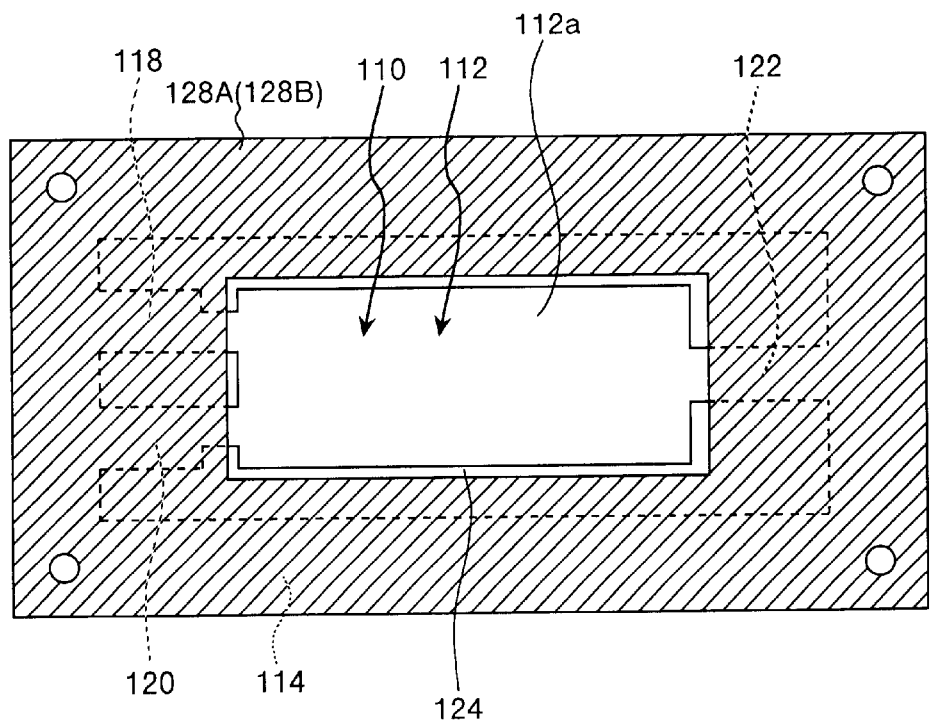
FIG. 14 is a horizontal sectional view of a conductor pattern shown in a third embodiment set in the metal mold.

FIG. 14 shows a third embodiment. The third embodiment is different from the second embodiment in that a conductor pattern 110 having no supporting piece 116 is used. In this case, an end edge of the radiating section 112a of the antenna conductor 112 on the side of the fixed terminal 122, the feeding terminal 118 and the ground terminal 120 are sandwiched between the division surfaces of the upper and lower metal molds 128A and 128B.

Figure 15:
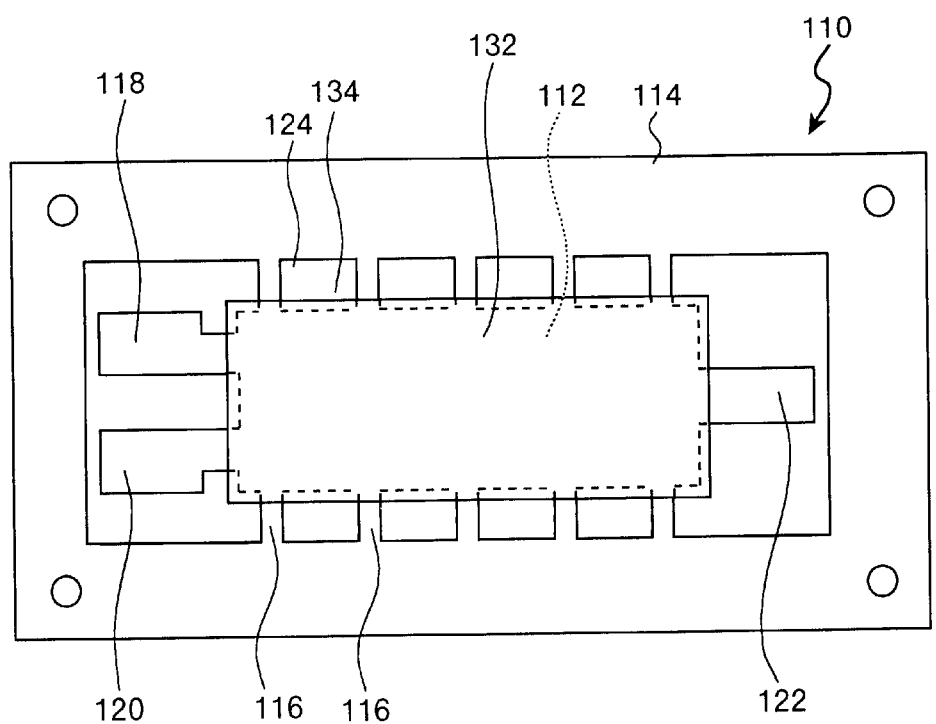
FIG. 15 is a plan view of a conductor pattern shown in a fourth embodiment of the invention.

FIG. 15 shows a fourth embodiment. FIG. 15 shows a state in which the formation step has been completed. The fourth embodiment is different from the second embodiment in that a conductor pattern 110 whose terminals 118, 120 and 122 are not connected to the frame 114 is used. In this embodiment, since the terminals 118, 120 and 122 are previously separated from the frame 114, the plating treatment of the entire peripheral surface (cut surface of the terminals becomes easy.

Figure 16:
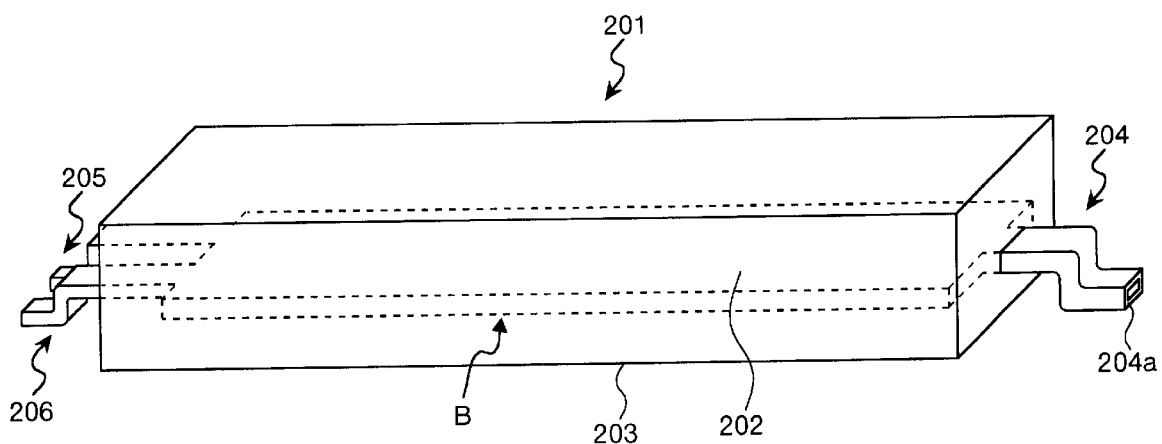
FIG. 16 shows an outline structure of a compact antenna of a fifth embodiment of the invention.

FIG. 16 shows an outline structure of a compact antenna of a fifth embodiment of the invention. In FIG. 16, a compact antenna 201 of the fifth embodiment includes an antenna conductor B having a rectangular parallelepiped radiating section 202, and a dielectric substrate 203 surrounding a periphery of the radiating section 202 without gap. The substrate 203 has a rectangular parallelepiped outer appearance. The radiating section 202 is formed at its opposite ends with terminals 204 to 206 projecting from the substrate 203.

Figure 17A:
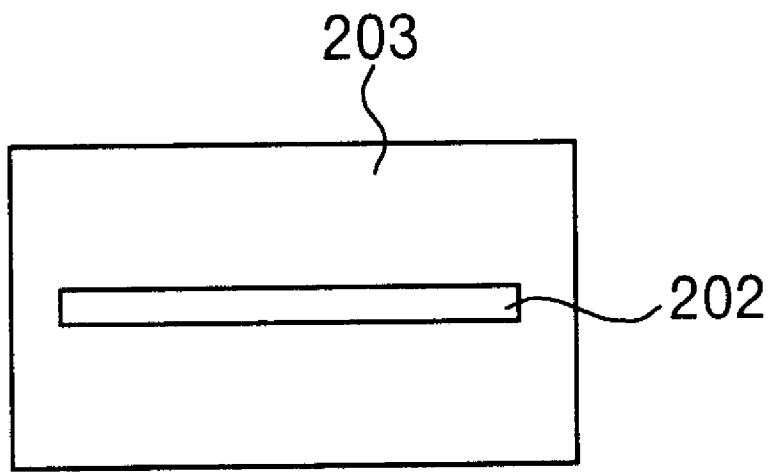
FIGS. 17 are transverse sectional view of a structure of the compact antenna shown in FIG. 16.
Figure 17B:
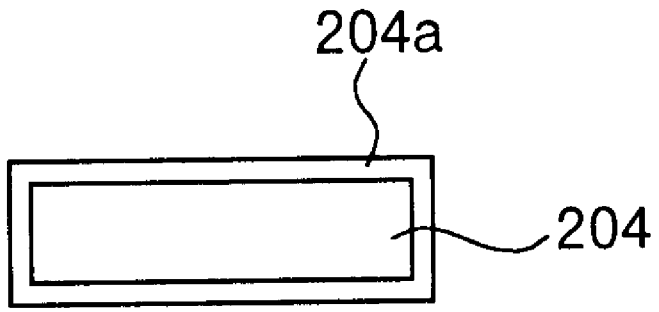

FIG. 17 are transverse sectional view of a structure of the compact antenna 201 shown in FIG. 16. FIG. 17A is a transverse sectional view of the radiating section 202 and the substrate 203, FIG. 17B is a transverse sectional view of the terminal 204. In FIG. 17A, the radiating section 202 is surrounded by the substrate 203 without gap. In FIG. 17B, the terminal 204 is a metal piece integrally formed together with the radiating section 202, and a surface of the terminal 204 is plated with the conductor film 204a. The conductor film 204a is formed so as to enhance the soldering wettability, and has lower electric conductivity than that of the metal plate described above. Like the terminal 204, the terminals 205 and 206 are metal pieces integrally formed together with the radiating section 202, and surfaces of the terminals 205 and 206 are plated with connection films 205a and 206a that are similar to the connection film 204a, respectively.

Figure 18A:
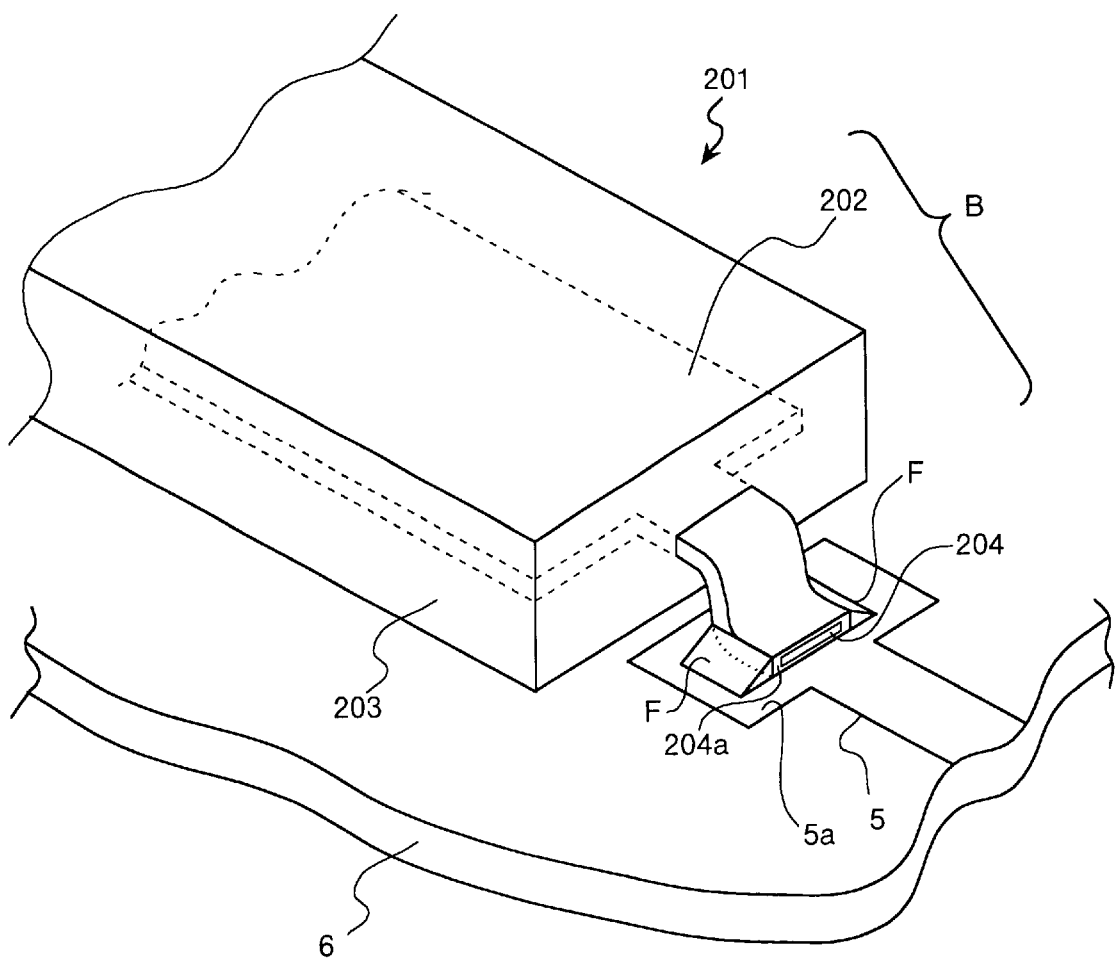
FIG. 18A is a perspective view and FIG. 18B is a sectional view.
Figure 18B:
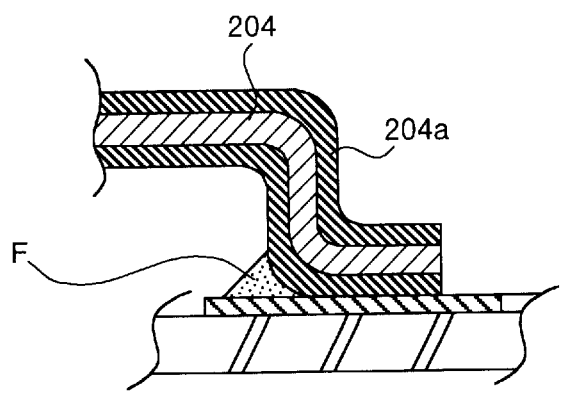

A mounting operation of this antenna to the substrate will be explained next. FIG. 18 shows a structure around the terminal 204 of the antenna. As shown in FIG. 18, the terminal 204 is soldered to a mounting section 5a of a conductor pattern 5 formed on a board 6 and with this, the terminal 204 is electrically connected to the mounting section 5a. The terminal 204 is connected to the mounting section 5a through a connection film 204a. With the connection film 204a, the adhesion (wettability) between the terminal 204 and the conductor pattern 5 can be enhanced. As a result, a portion where the connection film 204a exists is formed with a fillet F, and the bonding strength to the antenna conductor B to the board 6 is increased. The terminal 205 and the terminal 206 also have the same structure.

Figure 19:
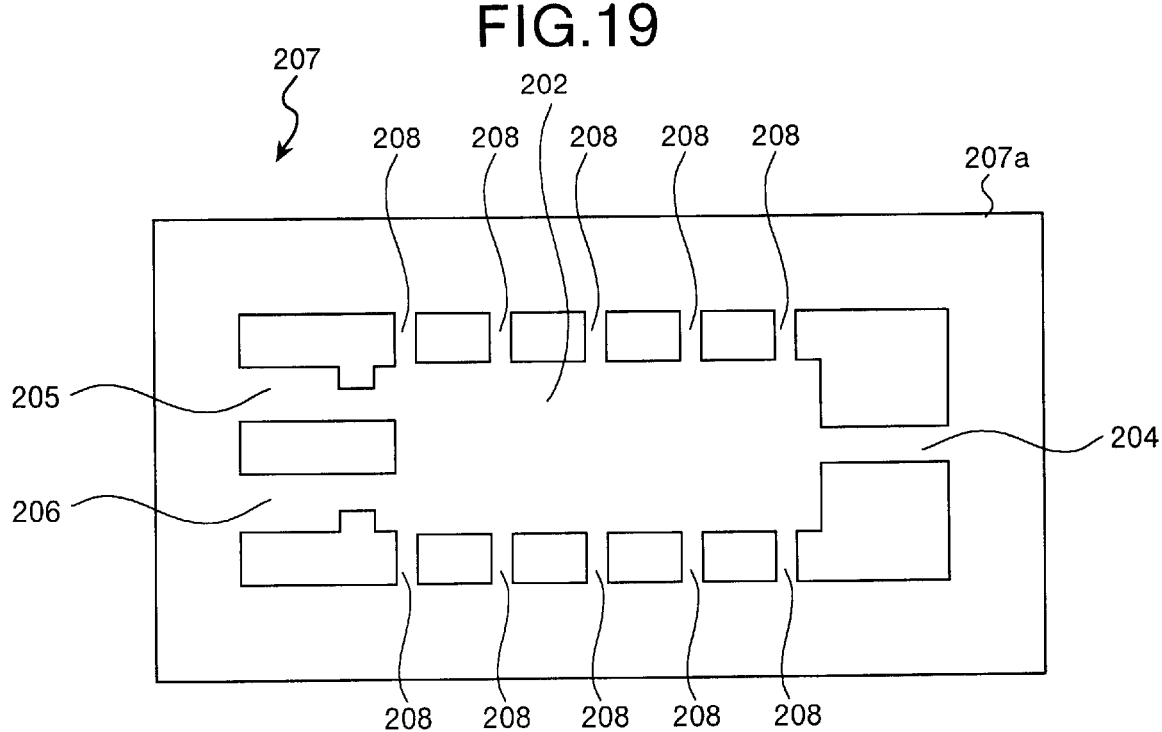
FIG. 19 shows a producing method of the compact antenna shown in FIG. 16 (part 1)

A producing method of a compact antenna 201 will be explained next with reference to FIGS. 19 to 21. To produce the compact antenna 201, a copper alloy plate is first punched to form the metal plate 207 shown in FIG. 19. The metal plate 207 has a frame 207a, and includes the radiating section 202 and the terminals 204 to 206 in the frame 207a. The terminals 204 to 206 are connected to the radiating section 202 and the frame 207a. The radiating section 202 and the frame 207a are connected to each other through a plurality of supporting sections 208.

Figure 20:
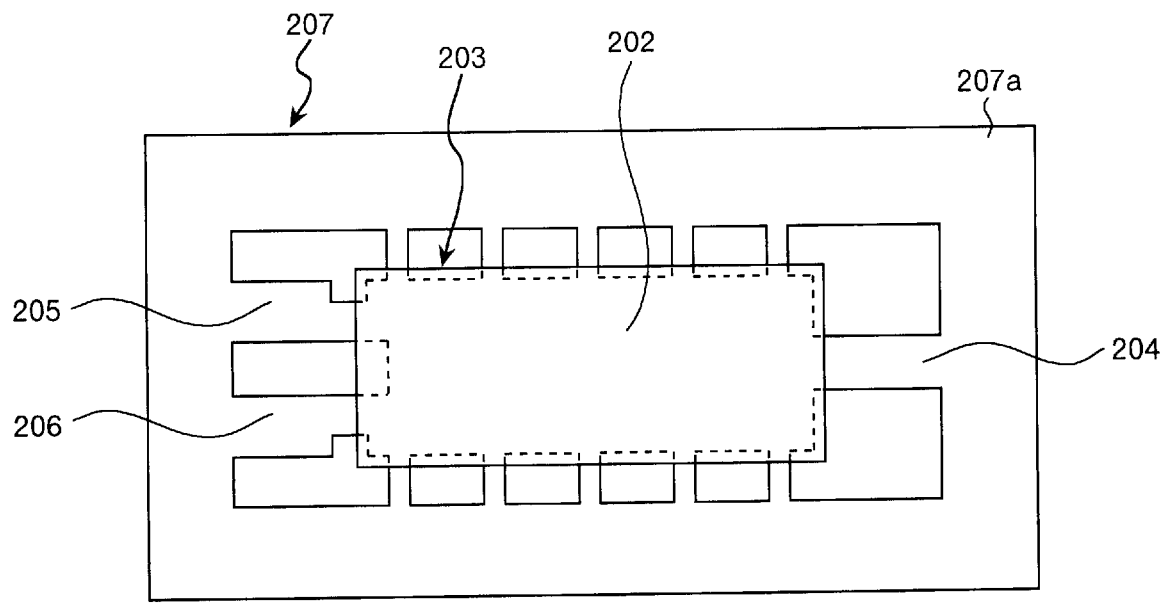
FIG. 20 shows a producing method of the compact antenna shown in FIG. 16 (part 2)
Figure 21:
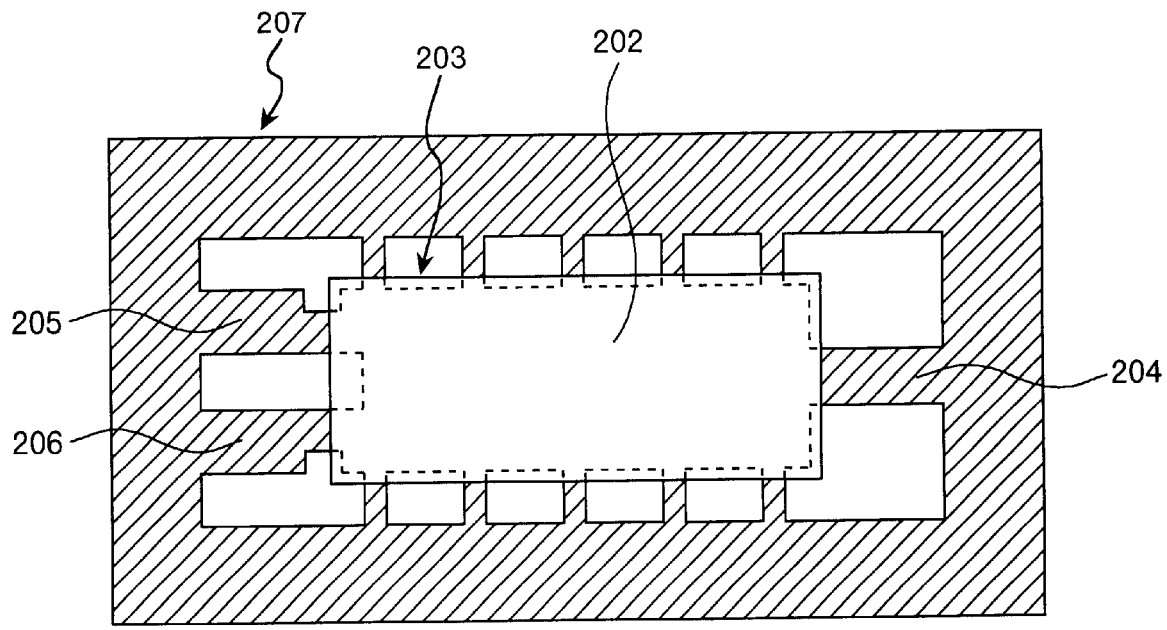
FIG. 21 shows a producing method of the compact antenna shown in FIG. 16 (part 3)

The metal plate 207 is inserted into an injection molding metal mold and then, a dielectric material (ceramic-resin compound material) is injection molded into a rectangular parallelepiped, thereby forming a substrate 203 (FIG. 20). At that time, the terminals 204 to 206 come outside the substrate 203. The entire surface of the metal plate 207 injection molded with the substrate 203 is plated with solder (FIG. 21). The substrate 203 functions as a mask, the frame 207a and the terminals 204 to 206 are selectively plated with solder, and the terminal 204 is formed with the connection film 204a. The terminals 205 and 206 are also formed in the same manner.

The plurality of supporting sections 208 are cut along the substrate 203, boundaries between the frame 207a and the terminals 204 to 206 are cut, so that the frame 207a and the supporting sections 208 are separated from each other, thereby obtaining the compact antenna 201.

According to the producing method of the compact antenna, since the terminals 204 to 206 can selectively be plated, it is possible to prevent the characteristics of antenna from being deteriorated which might be caused by solder adhering to the radiating section 202, and to enhance the adhesion (wettability) of the terminals 204 to 206 to the conductor pattern 5.

By using the substrate 203 as a mask of the solder plating, the step of masking can be omitted, the production is facilitated, and the producing cost can be reduced.

Figure 22:
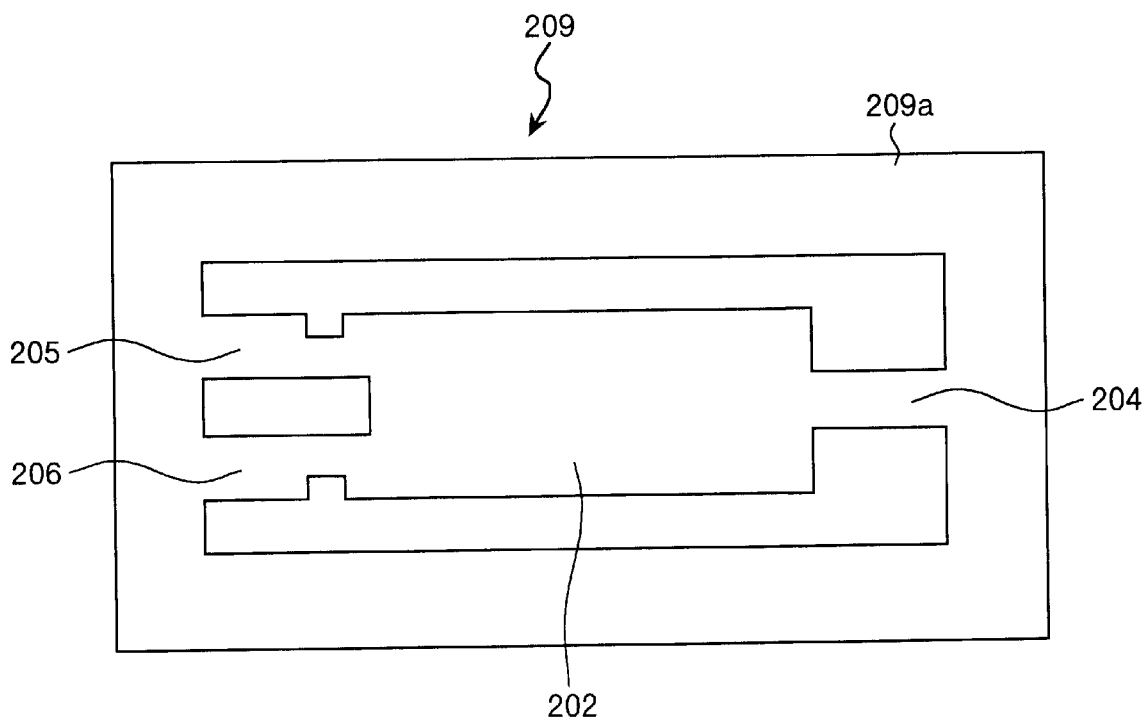
FIG. 22 shows a metal plate when a radiating section is fixed by connecting a terminal and a frame.

When the radiating section 202 can sufficiently be fixed by connecting the terminals 204 to 206 and the frame to each other, the supporting sections 208 can be omitted. FIG. 22 shows a metal plate when the radiating section is fixed by connecting the terminals 204 to 206 and the frame to each other. In FIG. 22, a metal plate 209 includes a frame 209a, and includes the radiating section 202 and the terminals 204 to 206 in the frame 209a. The terminals 204 to 206 are connected to the radiating section 202 and the frame 209a, and the radiating section 202 is fixed in the frame 209a. Other structure and its producing method are the same as those of the metal plate 207.

On the contrary, only the supporting section may be connected to the frame, the terminals and the frame may be separated and the metal plate may be stamped. FIG. 23 shows a metal plate in which the terminals and the frame are separated from each other. In FIG. 23, a metal plate 217 has a frame 217a, and includes an antenna conductor comprising the radiating section 202 and the terminals 214 to 216 in the frame 217a. The terminals 214 to 216 are connected to the radiating section 202, but are separated from the frame 217a. A plurality of supporting sections 218 are connected to the radiating section 202 and the frame 217a. The radiating section 202 and the terminals 214 to 216 are fixed in the frame 217a.

Figure 24A:
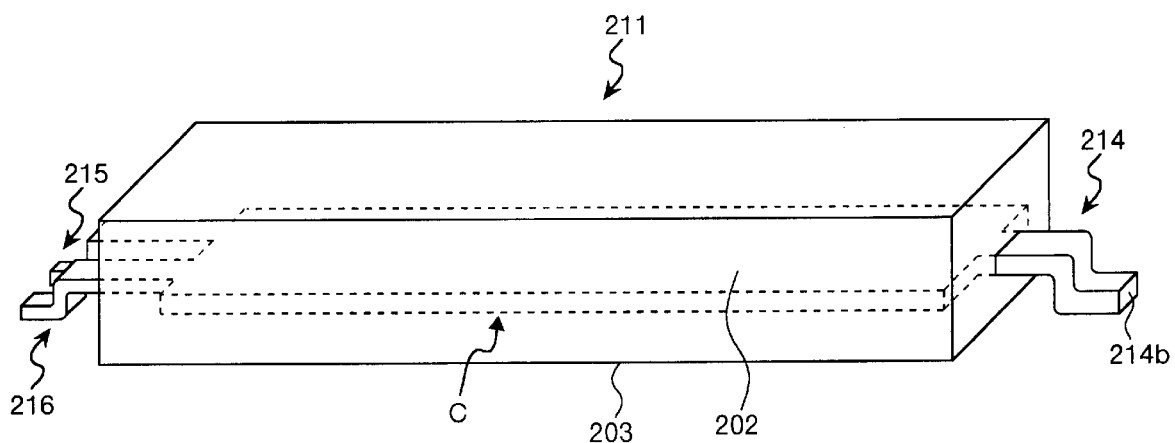
FIG. 24A shows a compact antenna produced by using the metal plate shown in FIG. 23.

Like the metal plate 207, the compact antenna is produced from the metal plate 217 in the following manner. That is, the radiating section 202 is subjected to injection molding to form the substrate 203, the terminals 214 to 216 are plated with solder and then, the supporting sections 218 are cut. FIG. 24 shows the compact antenna produced using the metal plate 217. A compact antenna 211 shown in FIG. 24 includes an antenna conductor C having a rectangular parallelepiped radiating section 202, and a substrate 203 having a rectangular parallelepiped outer appearance. The substrate 203 surrounds a periphery of the radiating section 202 without gap. Opposite ends of the radiating section 202 are formed with the terminals 214 to 216 projecting from the substrate 203. The terminals 214 to 216 are metal pieces integrally formed together with the radiating section 202. Surfaces of the terminals 214 to 216 are plated with connection film.

Figure 24B:
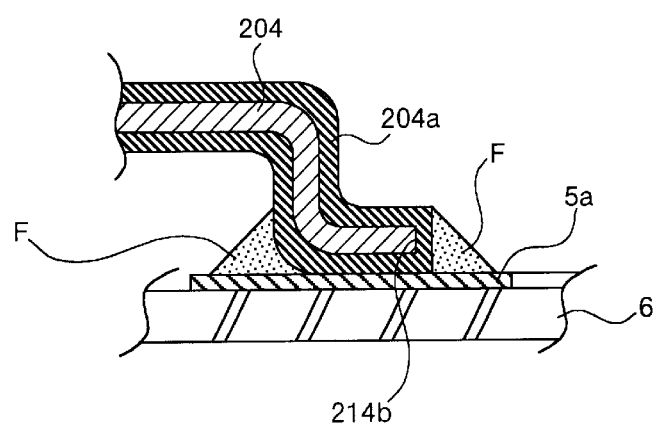
FIG. 24B is a sectional view of a terminal in a state in which the compact antenna is soldered to the circuit board.

The terminal 214 is stamped separately from the frame 217a and formed with the connection film 214a by solder plating. Therefore, all surfaces of the terminal 214 including the end surface 214b can be formed with the connection film 214a. Thus, all the surfaces the terminal 214 including the end surface 214b are covered with the connection film 214a, and adhesion (wettability) with respect to solder is enhanced. As a result, when the antenna is soldered to the board 6, the solder fillet F is formed up to the end surface 214b of the terminal 214, and the terminal is bonded by solder more strongly, as shown in FIG. 24B. All surfaces of the terminals 215 and 216 including their end surfaces are also covered with the connection films, and the adhesion (wettability) with respect to the conductor pattern can be enhanced.

When the metal plate 217 is formed, the terminal and the frame may be separated from each other to stamp the metal plate, or, the terminal and the frame may be connected to each other to stamp the metal plate and disconnected from each other before plating the plate with the connection film to form the connection film up to the end surface of the terminal. As a result, when soldering is carried out, the solder fillet F is formed up to the end surface of the terminal.

Figure 25:
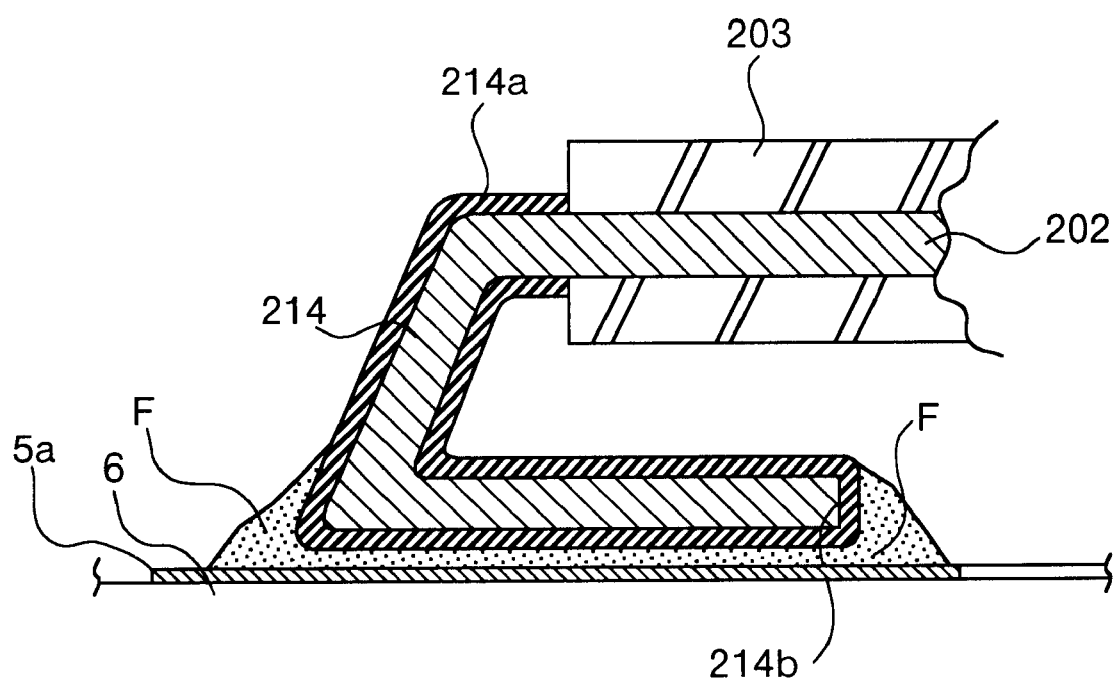
FIG. 25 is a sectional view of a terminal when the terminal is bent below the substrate and soldered to the board.
Figure 26A:
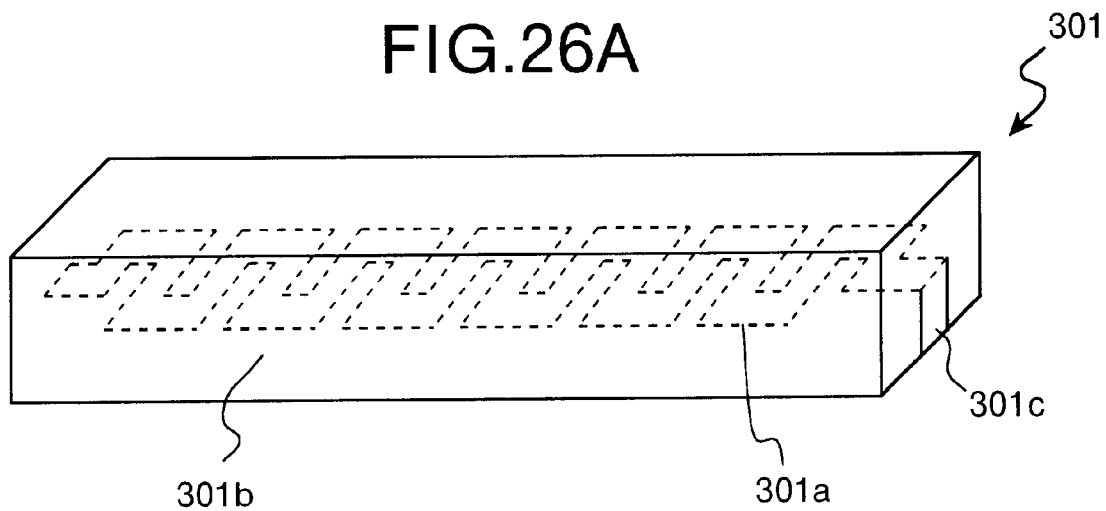
FIGS. 26 show an outline structure of a conventional compact antenna.
Figure 26B:
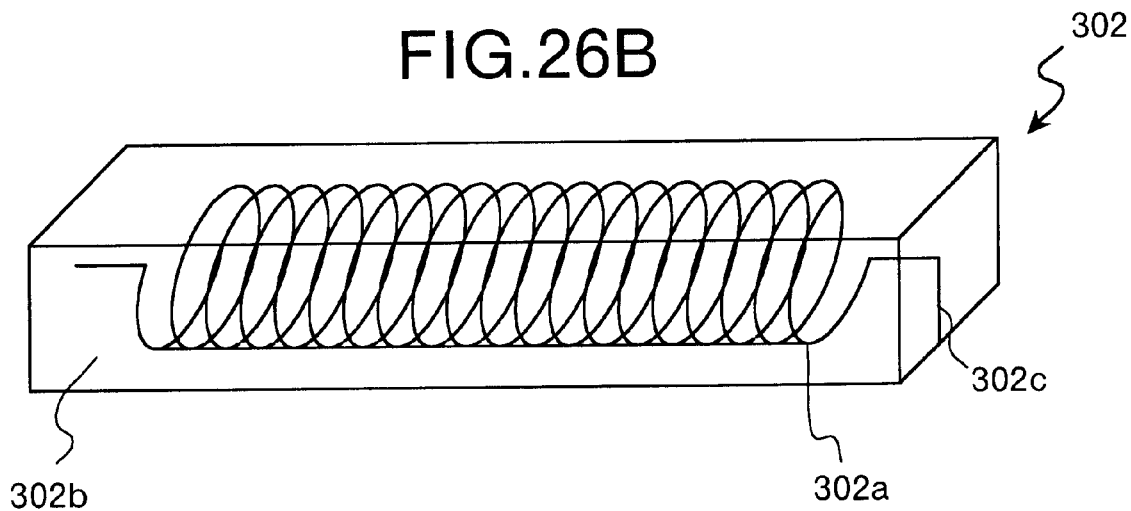

The terminal may be bent below the substrate and brought into contact with the board. FIG. 25 is a sectional view of the terminal 214 when the terminal 214 is bent below the substrate 203 and soldered to the board 6. In this compact antenna, if the terminal 214 is plated with solder after the terminal 214 is cut from the frame 217a, all the surfaces of the terminal 214 including the end surface 214b of the terminal 214 can be covered with the connection film 214a. As a result, in this compact antenna also, the solder fillet F is formed up to the end surface 214b of the terminal 214, and the terminal is soldered to the circuit board 6 more strongly.

The metal plate is not limited to the phosphor bronze, and various alloys can be used. Examples of suitable alloys are, 42 alloy (vertical elastic modulus=145 ($\times N^3/mm^2$), tensile strength=588 to 735 ($N/mm^2$)), Cu 0.15Cr0.1Sn (Furukawa Electric CO. Ltd.) Model=EFTEC-6) (vertical elastic modulus=119 ($\times N^3/mm^2$), tensile strength=353 to 431 ($N/mm^2$), elongation percentage$\geq$5(%), fatigue strength= 137 ($N/mm^2$)), Cu 0.1 Fe 0.03P (Furukawa Electric CO. Ltd.) Model=EFTEC-7) (vertical elastic modulus=119 ($\times N^3/mm^2$), tensile strength=353 to 431 ($N/mm^2$), elongation percentage$\geq$5(%), fatigue strength=137 ($N/mm^2$)), Cu 0.3Cr0.25Sn0.2Zn (Furukawa Electric (CO. Ltd.) Model= EFTEC-64T) (vertical elastic modulus=27 ($\times N^3/mm^2$), tensile strength=539 to 637 ($N/mm^2$), elongation percentage$\geq$5 (%), fatigue strength=265 ($N/mm^2$)), Cu2.5Ni0.6Si0.5Zn 0.03Ag (Furukawa Electric (CO. Ltd.) Model=EFTEC-23Z) (vertical elastic modulus=128 ($\times N^3/mm^2$) tensile strength= 620 to 740 ($N/nm^2$), elongation percentage$\geq$5(%), fatigue strength=275 ($N/mm^2$)). The chemical composition ratio shows standardized weight %. These metal plates are plated with connection film having high electric conductivity if necessary.

From the above embodiments, other various inventions can be grasped.

(1) A compact antenna comprising an antenna conductor having a bent linear core, and a conductor film which covers at least a portion of an outer surface of the core and which has higher electric conductivity than that of the core.

(2) The compact antenna according to (1), wherein the conductor film has a film thickness equal to or greater than a skin depth δ specified by the following equation:

$$\delta = \sqrt{(2/(\sigma \cdot \mu \cdot \omega))},$$

wherein σ is electric conductivity of the conductor, $\mu$ is magnetic permeability and ω is angular frequency.

(3) The compact antenna according to (1), wherein the core is made of copper alloy, and the conductor film is made of copper.

(4) A compact antenna having an antenna conductor comprising a radiating section for sending and receiving radio wave, and a terminal for connecting the radiating section and a circuit board, wherein the terminal is coated with a connection film for enhancing soldering characteristic, and the radiating section is not formed with the connection film.

(5) The compact antenna according to (4), wherein the connection film has lower electric conductivity than that of a layer of a surface of the radiating section.

(6) The compact antenna according to (4), wherein the connection film is formed by solder plating.

(7) The compact antenna according to (4), wherein the connection film covers all surfaces of the terminal.

(8) The compact antenna according to (4), wherein the radiating section and the terminal are formed by stamping metal plates.

(9) The compact antenna according to (4), wherein the radiating section is covered with dielectric, and the terminal is exposed from the dielectric.

(10) The compact antenna according to (4), wherein the antenna conductor comprises a core and a conductor film covering an outer surface of the core corresponding to at least a radiating section, and the conductor film is made of material having higher electric conductivity than that of the core.

(11) The compact antenna according to (10), wherein the conductor film has a film thickness equal to or greater than a skin depth δ specified by the following equation:

$$\delta = \sqrt{(2/(\sigma \cdot \mu \cdot \omega))},$$

Wherein σ is electric conductivity of the conductor, $\mu$ is magnetic permeability and ω is angular frequency.

(12) A producing method of a compact antenna comprising a stamping step in which an antenna conductor comprising a radiating section for sending and receiving radio wave and a terminal for connecting the radiating section to a circuit board is formed by stamping a metal plate, a coating step which coats the radiating section with dielectric, and a connection film forming step in which the connection film is selectively formed for the terminal using the dielectric as a mask.

(13) The producing method of the compact antenna according to (12), wherein at the stamping step, the metal plate is stamped into a shape including a frame which supports the antenna conductor, the producing method further comprises a cutting step for cutting an antenna conductor from the frame after the connection film forming step.

(14) The producing method of the compact antenna according to (13), wherein at the stamping step, the metal plate is stamped into a shape in which the frame and the terminal are separated from each other.

(15) The producing method of the compact antenna according to (13), wherein at the stamping step, the metal plate is stamped into a shape in which the frame and the terminal are continuous, the producing method further comprises a preliminary cutting step for cutting off the frame and the terminal before the connection film forming step.

As explained above, according to the present invention, there is effect that it is possible to realize an antenna conductor having high reliability and high radiation efficiency inexpensively.

The invention also exhibits effect that terminals of the antenna conductor can strongly be soldered to feeding electrode of the circuit board, deterioration of radiation characteristic caused by the connection film can be avoided and thus, mounting operability of the antenna can be enhanced without deteriorating the radiation characteristic.

The invention also exhibits effect that since the terminal of the antenna conductor is connected to the circuit board through the connection film which covers the entire surface of the terminal, the bonding strength between the terminal and the circuit board can further be enhanced.

The invention also exhibits effect that a compact antenna having excellent mounting operability to the circuit board can be provided with a simple producing method.

The invention also exhibits effect that since the connection film is formed using the dielectric coating the radiating section as a mask, it is possible to provide a compact antenna capable of satisfying both the radiation characteristic and the mounting operability with a simple producing method.

The invention also exhibits effect that since the connection film is selectively formed on the terminal using the dielectric as a mask, it is possible to easily and inexpensively provide a compact antenna having excellent adhesion between the terminal and the circuit board and having high radiation efficiency.

The invention also exhibits effect that since the end of the terminal is opened and the connection film is formed on all surfaces of the terminal, it is possible to easily produce a compact antenna capable of bonding the terminal and the circuit board more strongly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A compact antenna comprising an antenna conductor comprising:
    a bent linear core; and
    a conductor film which covers at least a portion of an outer surface of said core and which has higher electric conductivity than that of said core, said conductor film having a film thickness equal to or greater than a skin depth $\delta$ specified by the following equation: $\delta = \sqrt{2/(\sigma \cdot \mu \cdot \omega)}$ wherein $\sigma$ is electric conductivity of the conductor, $\mu$ is magnetic permeability and $\omega$ is angular frequency.

2. The compact antenna according to claim 1, wherein said core is made of copper alloy, and said conductor film is made of copper.

3. A compact antenna comprising an antenna conductor comprising a radiating section for sending and receiving radio wave, and a terminal for connecting said radiating section and a circuit board, wherein
    said terminal is coated with a connection film for enhancing soldering characteristic, and said radiating section is not formed with said connection film.

4. The compact antenna according to claim 3, wherein said connection film has lower electric conductivity than that of a layer of a surface of said radiating section.

5. The compact antenna according to claim 3, wherein said connection film is formed by solder plating.

6. The compact antenna according to claim 3, wherein said connection film covers all surfaces of said terminal.

7. The compact antenna according to claim 3, wherein said radiating section and said terminal are formed by punching metal plates.

8. The compact antenna according to claim 3, wherein said radiating section is covered with dielectric, and said terminal is exposed from said dielectric.

9. The compact antenna according to claim 3, wherein said antenna conductor comprises a core and a conductor film covering an outer surface of said core corresponding to at least a radiating section, and said conductor film is made of material having higher electric conductivity than that of the core.

10. The compact antenna according to claim 9, wherein said conductor film has a film thickness equal to or greater than a skin depth $\delta$ specified by the following equation:

$$\delta = \sqrt{2/(\sigma \cdot \mu \cdot \omega)},$$

wherein $\sigma$ is electric conductivity of the conductor, $\mu$ is magnetic permeability and $\omega$ is angular frequency.

11. A producing method of a compact antenna comprising:
    a punching step in which an antenna conductor comprising a radiating section for sending and receiving radio wave and a terminal for connecting said radiating section to a circuit board is formed by punching a metal plate;
    a coating step which coats said radiating section with dielectric; and
    a connection film forming step in which said connection film is selectively formed for said terminal using said dielectric as a mask.

12. The producing method of the compact antenna according to claim 11, wherein at the punching step, said metal plate is punched into a shape including a frame which supports said antenna conductor, the producing method further comprises a cutting step for cutting an antenna conductor from said frame after said connection film forming step.

13. The producing method of the compact antenna according to claim 12, wherein at the punching step, said metal plate is punched into a shape in which said frame and said terminal are separated from each other.

14. The producing method of the compact antenna according to claim 12, wherein
    at the punching step, said metal plate is punched into a shape in which said frame and said terminal are continuous, the producing method further comprises a preliminary cutting step for cutting off said frame and terminal before said connection film forming step.

* * * * *